(12) United States Patent
Lovmand et al.

(10) Patent No.: US 9,115,690 B2
(45) Date of Patent: Aug. 25, 2015

(54) THERMAL PROTECTION OF ELECTRICAL GENERATING COMPONENTS UNDER CONTINUOUS ACTIVE POWER GENERATION

(71) Applicant: FloDesign Wind Turbine Corp., Waltham, MA (US)

(72) Inventors: Bo Lovmand, Hadsten (DK); Claus Sejdelin Schrøder, Kjellerup (DK); Søren Dalsgaard, Hadsten (DK); Ove Styhm Kristensen, Hadsten (DK)

(73) Assignee: OGIN, INC., Waltham, MA (US)

( * ) Notice: Subject to any disclaimer, the term of this patent is extended or adjusted under 35 U.S.C. 154(b) by 0 days.

(21) Appl. No.: 13/902,318

(22) Filed: May 24, 2013

(65) Prior Publication Data
US 2013/0313827 A1 Nov. 28, 2013

Related U.S. Application Data

(60) Provisional application No. 61/651,537, filed on May 24, 2012.

(51) Int. Cl.
*F03D 7/02* (2006.01)
*F03D 7/00* (2006.01)
(Continued)

(52) U.S. Cl.
CPC .. *F03D 7/00* (2013.01); *F03D 7/02* (2013.01); *F03D 7/028* (2013.01); *F03D 7/0264* (2013.01); *H02J 3/1885* (2013.01); *F03D 1/04* (2013.01); *F05B 2270/1033* (2013.01);
(Continued)

(58) Field of Classification Search
CPC .......................................................... H02J 3/18
USPC ............................................................ 290/44
See application file for complete search history.

(56) References Cited

U.S. PATENT DOCUMENTS

| 4,674,279 A | * | 6/1987 | Ali et al. ........................ 60/398 |
| 5,321,308 A | * | 6/1994 | Johncock .................... 290/40 C |
| 6,204,642 B1 | * | 3/2001 | Lawson et al. ................. 322/20 |

(Continued)

FOREIGN PATENT DOCUMENTS

| SU | 855875 B | * | 8/1981 |
| WO | WO 0117085 A1 | * | 3/2001 |

OTHER PUBLICATIONS

International Search Report and Written Opinion issued in PCT/US2013/042685, dated Nov. 5, 2013.
(Continued)

*Primary Examiner* — Joseph Waks
(74) *Attorney, Agent, or Firm* — McCarter & English, LLP; David R. Burns

(57) ABSTRACT

Systems and methods for maintaining the active power production of a fluid turbine and regulating the temperature of an electrical generating component by controlling the reactive power production are disclosed. A thermal parameter of the electrical generating component is monitored. If the electrical generating component exceeds a thermal parameter the reactive power production of the turbine is reduced. A fluid turbine may be de-rated to further reduce an electrical generating component's thermal parameter. A fluid turbine may shut down to further reduce an electrical generating component's thermal parameter. A fluid turbine's power production is re-started when the electrical generating component returns to an acceptable thermal parameter.

20 Claims, 11 Drawing Sheets

(51) Int. Cl.
*H02J 3/18* (2006.01)
*F03D 1/04* (2006.01)

(52) U.S. Cl.
CPC ....... *F05B 2270/3032* (2013.01); *Y02E 10/723* (2013.01); *Y02E 10/763* (2013.01); *Y02E 40/32* (2013.01)

(56) References Cited

U.S. PATENT DOCUMENTS

| | | | |
|---|---|---|---|
| 6,737,767 | B2 | 5/2004 | Berggren et al. |
| 7,884,492 | B2* | 2/2011 | Xiong et al. ............. 290/55 |
| 8,400,003 | B2* | 3/2013 | Letas et al. ............. 290/44 |
| 8,504,213 | B2* | 8/2013 | Larsen ............. 700/292 |
| 2007/0097770 | A1* | 5/2007 | Ronkainen et al. ............. 365/211 |
| 2008/0106098 | A1* | 5/2008 | Miller et al. ............. 290/44 |
| 2010/0298991 | A1* | 11/2010 | Alonso Sadaba et al. .... 700/276 |

OTHER PUBLICATIONS

International Preliminary Report on Patentability issued in PCT/US2013/042685, dated Dec. 4, 2014.

* cited by examiner

THERMAL PROTECTION OF ELECTRICAL GENERATING COMPONENTS UNDER CONTINUOUS ACTIVE POWER GENERATION

RELATED APPLICATIONS

This application claims priority under 35 U.S.C. §119(e) to U.S. Provisional Patent Application Ser. No. 61/651,537, entitled "Thermal Protection of Electrical Generating Components Under Continuous Active Power Generation," filed on May 24, 2012, which is hereby incorporated by reference in its entirety.

FIELD OF INVENTION

Embodiments relate generally to thermal protection of electrical generating components under active and reactive power generation.

BACKGROUND

Conventionally when electrical generating components such as turbines, generators, converters, hydraulic oils, and the like exceed a maximum thermal parameter, the electrical generating control system will shut down the electrical generator until the thermal parameter is within the operating range before restarting. Some control systems will operate an electrical generating component at a reduced output, otherwise known as de-rating, until the thermal state of the electrical generating component is within the operating range.

In the field of turbines, many turbines employ liquid or air transfer systems, which use some of the electrical energy generated to keep an electrical generating component cool. This results in a net loss of energy production while mitigating the stress on thermally sensitive electrical generating components. Other turbines avoid the added expense and energy usage of a cooling system by de-rating or shutting down the turbine when electrical generating components have reached the limits of a thermal parameter.

Shutting down the turbine until the thermally sensitive electrical generating components have cooled ceases power production and eliminates stress on thermally sensitive electrical generating components. A de-rated turbine is limited at the upper regions of its power production range. De-rating a turbine to control the temperature of electrical generating components, results in a reduction of the rated power production, while mitigating the stress on the thermally sensitive components.

A sinusoidal alternating voltage applied to a purely resistive load provides an alternating current that is in phase with the voltage. Commonly, there is a reactive component and the system possess capacitance, inductance or both. Apparent Power is the absolute value of the combined power produced, real-Power (measured in Watts (W) and Reactive power, measured in Volt-Ampere-Reactive (VAR). Conventionally, capacitors are considered to generate reactive power and inductors to consume it. Capacitors or inductors are inserted in a circuit to consume or generate reactive power.

SUMMARY OF THE INVENTION

Embodiments taught herein are directed to a control systems and methods for maintaining the active power production of a fluid turbine and regulating the temperature of an electrical generating component by controlling the reactive power production. Some embodiments are directed to de-rating the reactive power production to maintain or cool the electrical generating component's operational temperature. Some embodiments are directed to de-rating the power rating of the fluid turbine to maintain or cool the electrical generating component's operational temperature. Some embodiments utilize a fluid turbine shut down operation when an electrical generating component exceeds a thermal parameter.

A fluid turbine refers to any combined rotor and generator including a wind turbine, a water turbine or the like comprising a rotor engaged with a generator for the purpose of electrical power generation. Electrical power generation systems often include a number of electrical generating components that may generate heat as part of their operation, including but not limited to generators, power converters, yaw motor transmissions, electric brakes and the like. An example method includes monitoring a thermal parameter of the electrical generating component. If the thermal state of the electrical component approaches or exceeds the thermal parameter the reactive power production is reduced. If the thermal state of the electrical generating component continues to exceed the thermal parameter while in a reduced reactive power generating state, the turbine is de-rated. A de-rated turbine generates less than the amount of energy at the turbine's rated power level, while allowing the electrical generating component to cool. If the electrical generating component's thermal state continues to exceed the thermal parameter while in a de-rated state, the turbine is shut down. In some embodiments, the turbine can resume a power generation after the electrical generating component's thermal state returns to an acceptable range for the thermal parameter.

In another example embodiment, a fluid turbine power generation system is configured to maintain the active power production and regulate a temperature of the electrical generating component by controlling the reactive power production. The system includes a rotor/stator assembly, an active power system configured to receive the first control signal from the control unit and a reactive power system configured to receive the second control signal from the control unit and the electrical generating component having a thermal sensor configured to transmit thermal data to the control unit. The control unit is electrically connected to the active power system and the reactive power system and the electrical generating component. The control unit is configured to receive the thermal data from the electrical generating component. Based on the thermal data the control unit transmits the first control signal to the active power system to maintain consistent power production and the second control signal to the reactive power system to vary the power production.

In another example embodiment, a non-transitory computer-readable medium has stored thereon computer-executable instructions that when executed by at least one computer processor unit preforms a control method maintaining the active power production of a fluid turbine and regulating a temperature of an electrical generating component of the fluid turbine by controlling the reactive power production. The processor monitors a thermal parameter of the electrical generating component. The processor determines if the electrical generating component exceeds a thermal limit and then reduces the reactive power production.

Any combination of embodiments is envisioned. Other objects and features will become apparent from the following detailed description considered in conjunction with the accompanying drawings. It is to be understood, however, that the drawings are designed as an illustration only and not as a definition of the limits of the invention.

BRIEF DESCRIPTION OF THE DRAWINGS

The accompanying drawings are not intended to be drawn to scale. In the drawings, each identical or nearly identical component that is illustrated in various figures is represented by a like numeral. For the purposes of clarity, not every component may be labeled in every drawing.

DETAILED DESCRIPTION

Figure 1:
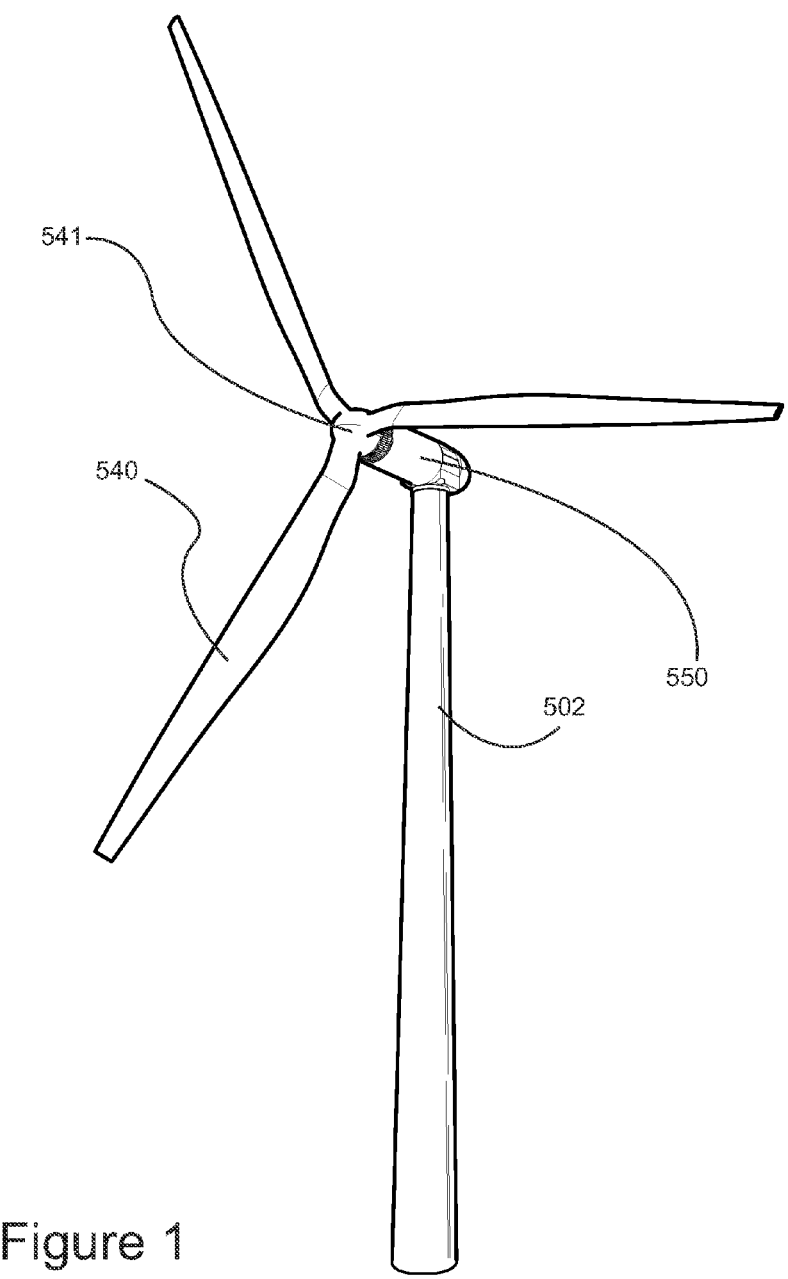
FIG. 1 is an example front perspective view of an open fluid turbine.

Although specific terms are used in the following description, these terms are intended to refer to particular structures in the drawings and are not intended to limit the scope of the present disclosure. It is to be understood that like numeric designations refer to components of like function.

The term "about" or "approximately" when used with a quantity includes the stated value and also has the meaning dictated by the context. For example, it includes at least the degree of error associated with the measurement of the particular quantity. When used in the context of a range, the term "about" or "approximately" should also be considered as disclosing the range defined by the absolute values of the two endpoints. For example, the range "from about 2 to about 4" or "from approximately 2 to approximately 4" also discloses the range "from 2 to 4."

A fluid turbine refers to any combined rotor and generator including a wind turbine, a water turbine or the like comprising a rotor engaged with a generator for the purpose of electrical power generation. Electrical power generation systems typically include a number of electrical generating components that may generate heat as part of their operation, including but not limited to generators, power converters, yaw motor transmissions, electric brakes and the like.

Although the aerodynamic principles of the shrouded fluid turbines discussed herein are with respect to air, it should be understood that the aerodynamic principles of the shrouded fluid turbines are not restricted to air and apply to any fluid, e.g., any liquid, gas, or combinations thereof, and therefore including water as well as air. For example, the aerodynamic principles of a mixer-ejector turbine apply to hydrodynamic principles in a shrouded mixer ejector water turbine. Further, embodiments may be described in relation to shrouded turbine applications, both mixer-ejector turbines and shrouded turbines free of an ejector shroud.

In example embodiments a shrouded mixer-ejector turbine includes an ejector shroud. The shrouded turbines may include tandem cambered shrouds forming a mixer/ejector pump. The turbine shroud encloses a rotor which extracts power from a primary fluid stream. The tandem cambered shrouds bring more flow through the rotor allowing more energy extraction due to higher flow rates. The mixer/ejector pump transfers energy from the bypass flow, that is, fluid flow that flows past the exterior of the turbine shroud, to the rotor wake flow allowing higher energy per unit mass flow rate through the rotor. These effects enhance the overall power production of the example shrouded turbine system.

The term "rotor" is used herein to refer to any assembly in which one or more blades are attached to a shaft and able to rotate, allowing for the extraction of power or energy from fluid rotating the blades. Example rotors may include a propeller-like rotor or a rotor/stator assembly. Any type of rotor may be enclosed within the turbine shroud in the shrouded turbine of the present disclosure.

The term "electrical generating component" is used herein to refer to a component or any number of components that may generate heat as a part of their operation. Electrical generating components may be analyzed individually. Alternatively, electrical generating components may be grouped into subsystems and a thermal parameter may be established for each component or for the subsystem. Example electrical generating component subsystems may include a generator, a power converter, a yaw motor transmission or an electric break. The regulation of reactive power generation mitigates the flow of current through some or all of the electrical generating components, and therefore mitigates the thermal state of the component. Operation of electrical generating components in a condition that exceeds the use parameters may result in component degradation and system downtime.

For any given grid voltage requirement, a level of reactive power production is necessary. Generating more reactive power than the electrical generation equipment is designed for may cause an electrical generating component to overheat. Example embodiments of the present disclosure include the fluid turbine's electrical generating equipment configured to produce or consume more reactive power than necessary in order to compensate for the potential reduction in reactive power production. An example embodiment is configured for continuous generation of reactive power while generating active power. This configuration eliminates the need to require more reactive power than a turbine is designed to produce, in order to support a given grid voltage.

Figure 6:
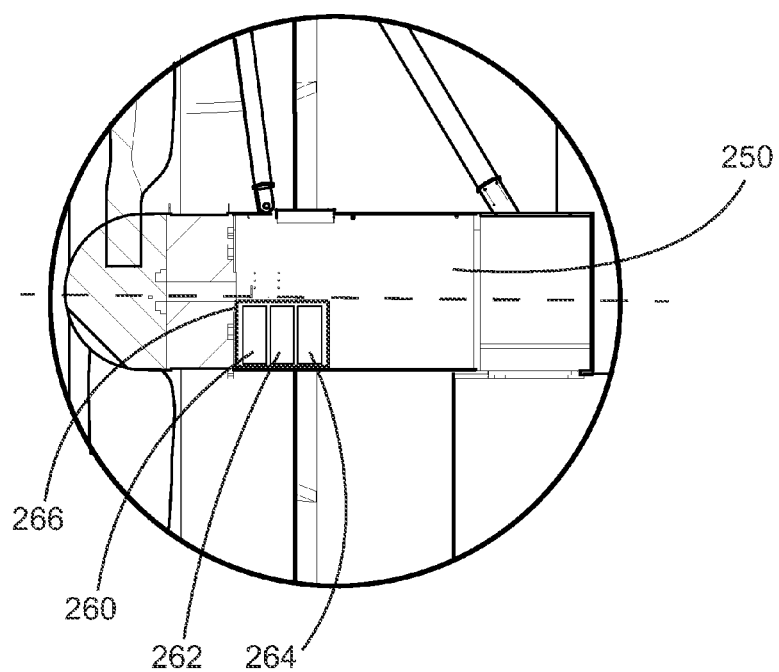
FIG. 6 is an example cross sectional view of a nacelle of any of the fluid turbines illustrated in FIGS. 1-5.

FIG. 1 illustrates a front perspective view of an example un-shrouded or open fluid turbine. FIG. 1 is a front perspective view of an example embodiment of a fluid turbine 500. Referring to FIG. 1, the shrouded fluid turbine 500 includes a nacelle body 550, a rotor 540 and a support tower 502. The nacelle body 550 includes a central hub 541 at the proximal end of the rotor blades 540. The central hub 541 is rotationally engaged with the nacelle body 550. The nacelle body 550 houses a control system including a control unit 266, a reactive power system 260, an active power system 262, and an electrical generating component 264 as illustrated in FIG. 6. A support structure 502 is engaged with the nacelle body 550.

Figure 2:
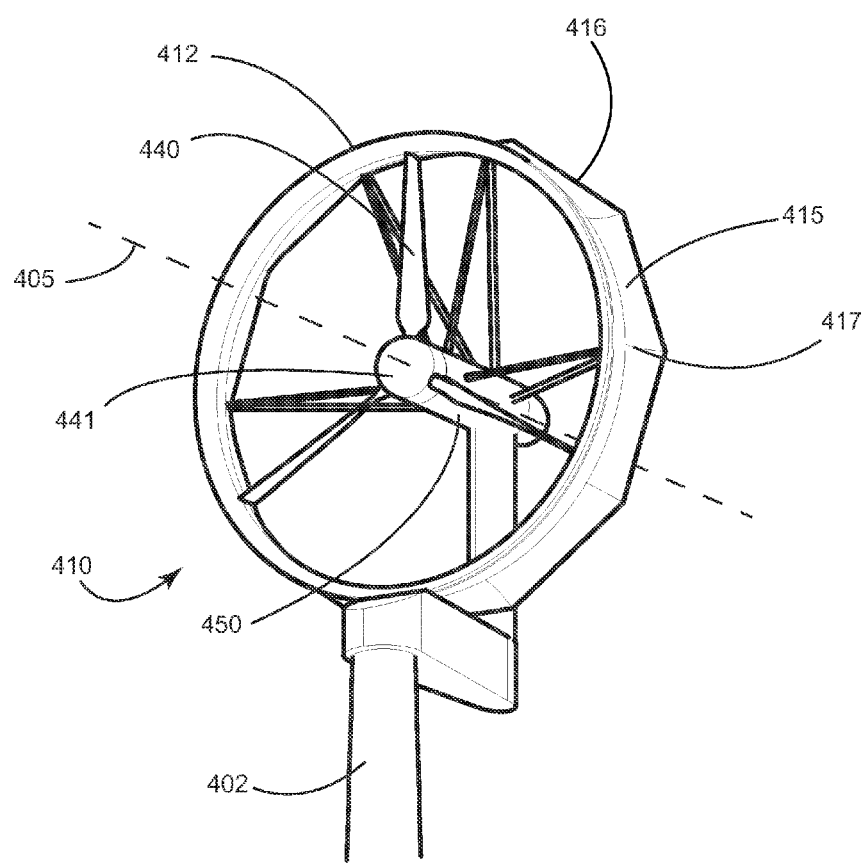
FIG. 2 is an example front perspective view of a fluid turbine with a single shrouded faceted design.

FIG. 2 illustrates a front perspective view of an example shrouded fluid turbine. FIG. 2 is a front perspective view of an example embodiment of a fluid turbine 400 having a single shroud. Referring to FIG. 2, the shrouded fluid turbine 400 includes a single turbine shroud 410, a nacelle body 450, and a rotor 440. The turbine shroud 410 includes a front end 412, also known as an inlet end or a leading edge. The turbine shroud 410 also includes a rear end 416, also known as an exhaust end or trailing edge. The trailing edge may include substantially linear segments 415 that have substantially constant cross sections and enjoin at nodes 417.

The rotor 440 surrounds the nacelle body 450 and includes a central hub 441 at the proximal end of the rotor blades 440. The central hub 441 is rotationally engaged with the nacelle body 450. In the illustrated embodiment, the rotor 440 and turbine shroud 410 are coaxial with each other, i.e., they share a common central axis 405. The nacelle body 550, houses a control system including a control unit 266, a reactive power system 260, an active power system 262, an electrical generating component 264. A support structure 402 is engaged with nacelle body 450.

Figure 3:
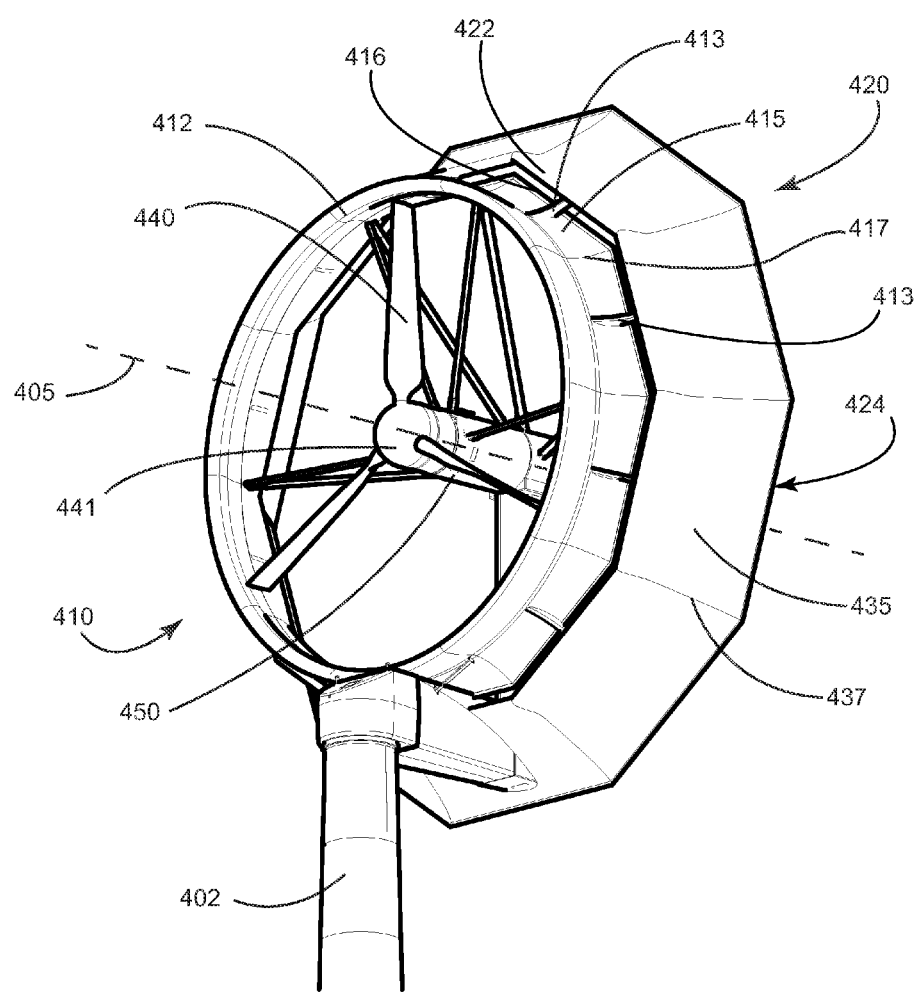
FIG. 3 is an example front perspective view of a fluid turbine with a mixer shroud and an ejector shroud faceted design.

FIG. 3 illustrates a front perspective view of an example mixer and ejector shrouded fluid turbine. FIG. 3 is a front perspective view of an example embodiment of a fluid turbine 400 having a mixer shroud and an ejector shroud. Referring to FIG. 3, the shrouded fluid turbine 400 includes a mixer turbine shroud 410, a nacelle body 450, and a rotor 440. The mixer turbine shroud 410 includes a front end 412, also known as an inlet end or a leading edge. The turbine shroud 410 also includes a rear end 416, also known as an exhaust end or trailing edge. The trailing edge may include substantially linear segments 415 that have substantially constant cross sections and enjoin at nodes 417.

The ejector shroud 420 includes a front end, inlet end or leading edge 422, and a rear end, exhaust end or trailing edge 424. The ejector shroud 420 at least partially surrounds the trailing edge 416 of the mixer turbine shroud. The trailing edge may include substantially linear segments 435 that have substantially constant cross sections and enjoin at nodes 437. Support members 413 connect the turbine shroud 410 to the ejector shroud 420. These support members 413 may take numerous forms and may further be designed to have an airfoil shape capable of providing an additional yaw influence.

The rotor 440 surrounds the nacelle body 450 and includes a central hub 441 at the proximal end of the rotor blades 440. The central hub 441 is rotationally engaged with the nacelle body 450. In the illustrated embodiment, the rotor 440 and turbine shroud 410 are coaxial with each other, i.e., they share a common central axis 405. The nacelle body 550, houses a control system including a control unit 266, a reactive power system 260, an active power system 262, and an electrical generating component 264, as illustrated in FIG. 6. A support structure 402 is engaged with the nacelle body 450.

Figure 4:
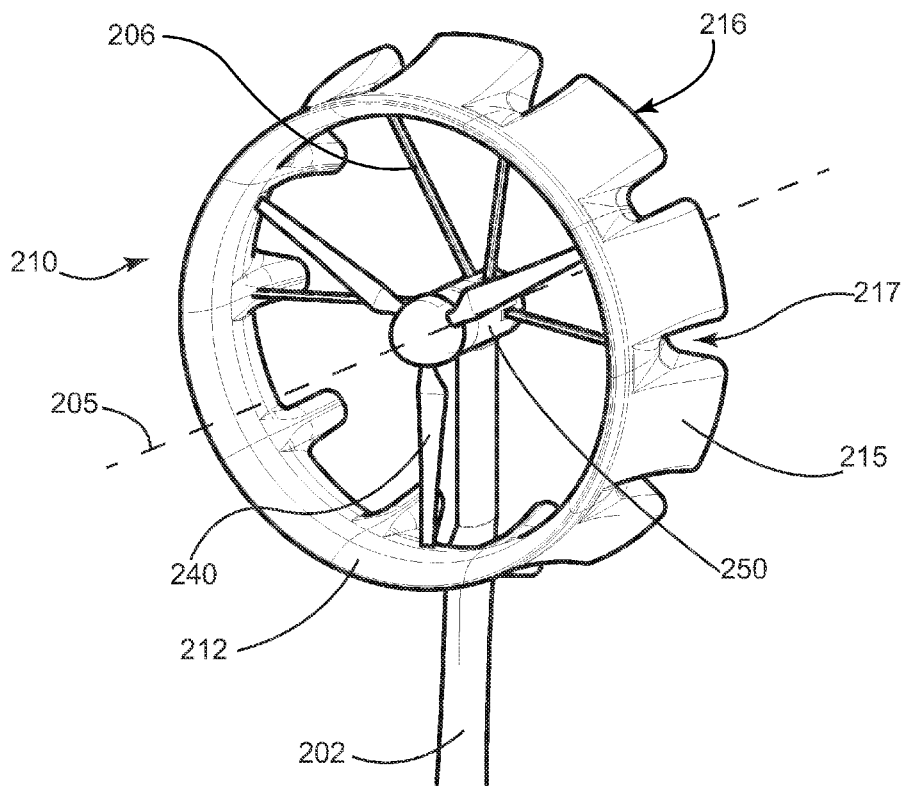
FIG. 4 is an example front perspective view of another fluid turbine with a single shroud design.

FIG. 4 illustrates a front perspective view of an example fluid turbine with a single shroud faceted design. FIG. 4 is a perspective view of an example embodiment of a shrouded fluid turbine 200. Referring to FIG. 4, the shrouded fluid turbine 200 includes a turbine shroud 210, a nacelle body 250, and a rotor 240. The turbine shroud 210 includes a front end 212, also known as an inlet end or a leading edge. The turbine shroud 210 also includes a rear end 216, also known as an exhaust end or trailing edge. The turbine shroud 210 may include converging mixing elements 217 that extend or curve inwardly toward a central axis 205, and diverging mixing elements 215 that extend or curve outwardly away from the central axis 205. It will be understood that, in some example embodiments, the mixing elements 215 and/or 217 may take on a variety of forms and may be located in a variety of suitable locations along the length of the turbine shroud 210 (e.g., at any position between and including the leading edge 212 and the trailing edge 216 of the turbine shroud 210). For example, the trailing edge 216 may include the converging mixing elements 217 and/or the diverging mixing elements 215.

The rotor 240 surrounds the nacelle body 250. In the illustrated embodiment, the rotor 240, and the turbine shroud 210, are coaxial with each other, i.e., they share a common central axis 205. In some example embodiments, the rotor 240, and turbine shroud 210, are not necessarily coaxial with each other along the common central axis 205. The nacelle body 550, houses a control system including a control unit 266, a reactive power system 260, an active power system 262, and an electrical generating component 264 as illustrated in FIG. 6. The support structure 202 is engaged at the nacelle 250.

Figure 5:
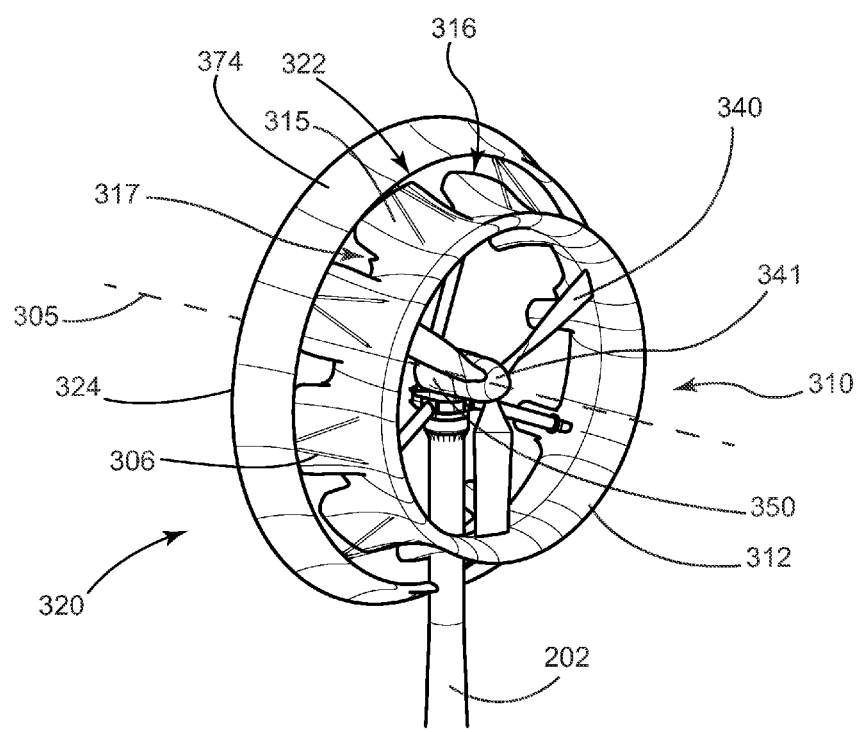
FIG. 5 is an example front perspective view of another fluid turbine with a mixer shroud and an ejector shroud design.

FIG. 5 is a perspective view of an example embodiment of a shrouded fluid turbine 300. Referring to FIG. 5, the shrouded fluid turbine 320 includes a turbine shroud 310, a nacelle body 350, a rotor 340, and an ejector shroud 374. The turbine shroud 310 includes a front end 312, also known as an inlet end or a leading edge. The turbine shroud 310 also includes a rear end 316, also known as an exhaust end or trailing edge. The turbine shroud 310 may include converging mixing elements 317 that extend or curve inwardly toward a central axis 305, and diverging mixing elements 315 that extend or curve outwardly away from the central axis 305. It will be understood that, in some example embodiments, the mixing elements 315 and/or 317 may take on a variety of forms and may be located in a variety of suitable locations along the length of the turbine shroud 310 (e.g., at any position between and including the leading edge 312 and the trailing edge 316 of the turbine shroud 310). For example, the trailing edge 316 may include the converging mixing elements 317 and/or the diverging mixing elements 315.

The ejector shroud 374 includes a front end, inlet end or leading edge 322, and a rear end, exhaust end or trailing edge 324. The ejector shroud 374 at least partially surrounds the trailing edge 315 of the turbine shroud. Support members 306 connect the turbine shroud 310 to the ejector shroud 374.

The rotor 340 surrounds the nacelle body 350 and includes a central hub 341 at the proximal end of the rotor 340. The central hub 341 is rotationally engaged with the nacelle body 350. In the illustrated embodiment, the rotor 340, turbine shroud 310, and ejector shroud 374 are coaxial with each other, i.e., they share a common central axis 105. In some example embodiments, the rotor 340, turbine shroud 310, and/or ejector shroud 374 are not necessarily coaxial with each other along the common central axis 305. The nacelle body 550, houses a control system including a control unit 266, a reactive power system 260, an active power system 262, and an electrical generating component 264. The support structure 202 is engaged at the nacelle 350.

FIG. 6 is a cross sectional and expanded view of nacelle 550, 450, 450, 250 and 350 for FIGS. 1, 2, 3, 4 and 5 respectively. Within nacelle body 260, a control system may be configured. The control system includes a control unit 266, a reactive power system 260, an active power system 262, and an electrical generating component 264. The nacelle body includes components as illustrated in FIGS. 8-10b. In some example embodiments, a control unit 266, a reactive power system 260, an active power system 262, and an electrical generating component 264, may be placed in a support member, a tower, a base of the tower, a tower support structure or in an auxiliary structure.

Figure 7:
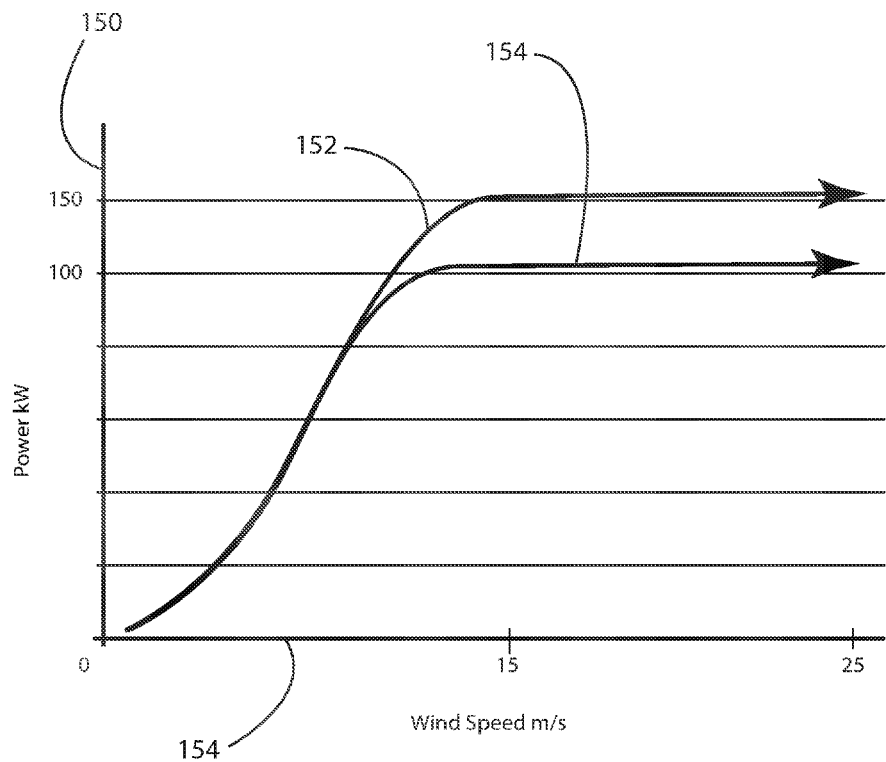
FIG. 7 is an example graph illustrating the power curves of an example fluid turbine and an example de-rated turbine.

FIG. 7 illustrates an example of a power curve representative of a de-rated turbine. The power curve measures kilowatts (kW) on the vertical axis 150, and wind speed in meters per second m/s on the horizontal axis 154. A turbine in normal operation is represented by plot 152, and reaches rated power of approximately 150 kW or greater and employs various control means to maintain rated power. A de-rated turbine as represented by plot 156, generates less than normal power in partial load operation and is limited at the upper regions of its power production range. For example, in the example embodiment, de-rated turbine plot 156, maintains power generation at 100 kW or greater, but at less than rated power, at rated wind speed, though it is configured to generate 150 kW at rated wind speed.

Figure 8:
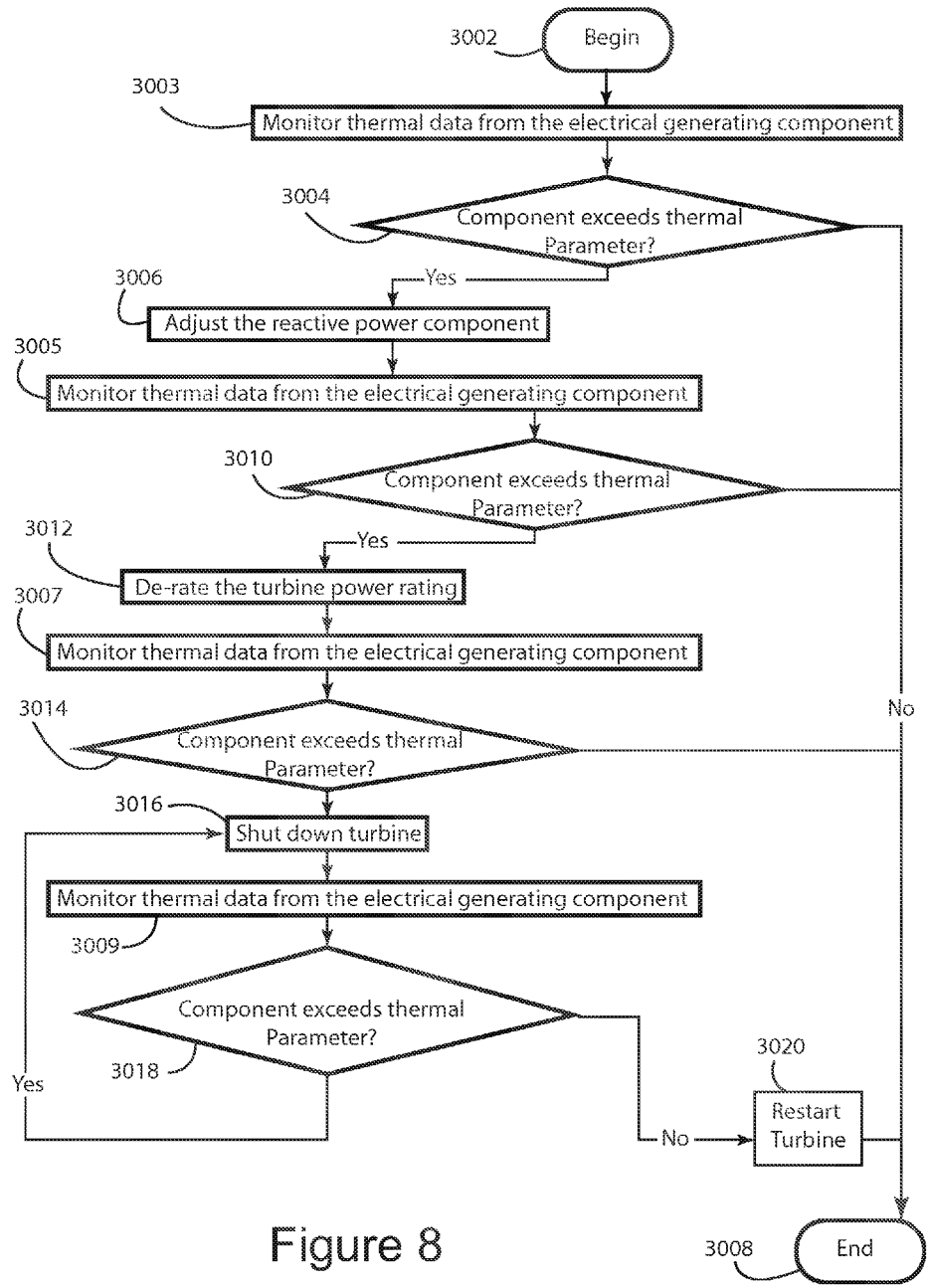
FIG. 8 is a block diagram illustrating an example method for maintaining active power production of a fluid turbine.

FIG. 8 is a block diagram of an exemplary method for maintaining the active power production of a fluid turbine and regulating the temperature of an electrical generating component of the fluid turbine by controlling the reactive power production. Process 3000, begins at step 3002. At step 3002, the fluid turbine is on, but may not be generating active power, and a temperature of one or more electrical generating components is monitored. The process of determining the reactive power rating, the active power rating and monitoring of the thermal data from the electrical generating component with a thermal sensor may occur continuously while the fluid turbine is in operation or at varying time intervals. The time intervals may be predetermined or reactive to electrical generation or climate conditions.

At step 3003, the process monitors the thermal data from the electrical generating component. At step 3004, the process determines if the thermal data from the electrical generating component exceeds a thermal limit. If the electrical generating component does not exceed the thermal limit process 3000 ends at step 3008 with the turbine returning to normal operational conditions. In some embodiments the process returns to step 3002 to continue to monitor the thermal parameter. Monitoring the thermal data at steps 3004, 3010, 3014 and 3018 may be made by the same thermal sensor or by a plurality of thermal sensors. The thermal limit may be fixed or variable. The thermal limit may vary depending on the type of electrical generating component. The thermal limit may be uniform for all electrical generating components in the electrical generation system. The thermal sensor may be configured to adjust based on input from additional variables impacting the temperature of the components such as ambient air temperature, wind speed, load parameter, the electrical current, the electrical voltage, a rotational speed of the turbine or any additional climate conditions.

If the thermal data exceeds the thermal limit at step 3004, process 3000 proceeds to step 3006. At step 3006, the reactive power component adjusts the reactive power rating in response to the thermal data from the electrical generating component. Process 3000 may continue through one or more additional feedback cycles of monitoring the thermal data as in step 3006 and then returns to step 3004. Alternatively, the process may proceed to step 3005.

At step 3005, the process monitors the thermal data from the electrical generating component. At step 3005, the reactive power rating for the fluid turbine has been adjusted. At step 3010, the process determines if the thermal data from the electrical generating component exceeds a thermal limit. If the electrical generating component does not exceed the thermal limit process 3000 ends at step 3008, with the turbine returning to normal operational conditions. If the data exceeds the thermal limit process 3000 proceeds to step 3012, where the turbine power is de-rated. Process 3000, may proceed to step 3007. In an alternate embodiment process 3000 may continue back to step 3010 through one or more additional cycles.

At step 3007, the process monitors the thermal data from the electrical generating component. At step 3014, process 3000, determines if the thermal data from the electrical generating component exceeds the thermal limit. If the electrical generating component does not exceed the thermal limit the process 3000 ends at step 3008 with the turbine returning to normal operational conditions. If the data exceeds the thermal parameter process 3000 proceeds to step 3016, which initiates a turbine shut down operation. Process 3000, may then proceed to step 3009.

At step 3009, the thermal data from the electrical generating component is monitored. At step 3018, process 3000, determines if the electrical generating component exceeds a thermal limit. If the electrical generating component does not exceed the thermal limit the process 3000 proceeds to step 3020 where the fluid turbine is re-started. The process then ends at step 3008, with the turbine returning to normal operational conditions. If the data exceeds the thermal limit process 3000 proceeds to step 3016, which maintains the turbine shut down operation. Process 3000 may then proceed to step 3018 through one or more additional process cycles until the electrical generating component had returned to within an acceptable thermal parameter. Process 3000 proceeds to step 3020 where the fluid turbine is re-started.

Figure 9:
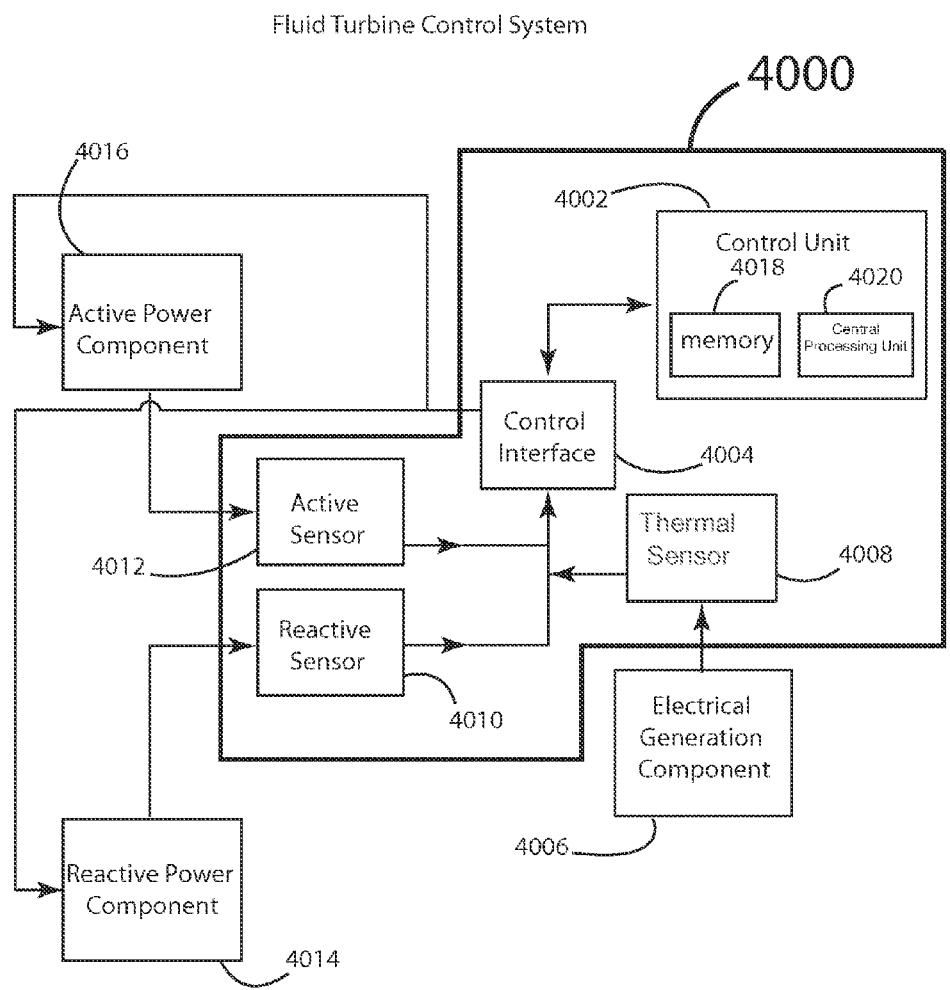
FIG. 9 is an example block diagram illustrating an example control system of a fluid turbine.

FIG. 9 is a block diagram of an example diagram for a control system for a fluid turbine. A control method in accordance with embodiments taught herein may determine the fluid turbine's active power rating, reactive power rating and monitor an electrical generating component's thermal data or temperature. If the thermal data from the electrical generating component exceeds the thermal limit a signal is sent to the fluid turbine's reactive power component to adjust the fluid turbine's operational performance. A control system is in communication with an active power component, a reactive power component and an electrical component.

In some embodiments a control system 4000, includes a control unit 4002, including a memory 4018, and a central processing unit 4020, a control interface 4004, a component sensor 4008, an active sensor 4012 and a reactive sensor 4010. The control unit 4002, is coupled to the control interface 4004. The control unit 4002 is configured with memory 4018 and a central processing unit 4020, to execute computer readable code read for example, from a non-transitory computer readable medium such as a memory, a hard drive, a thumb drive or the like. The control interface 4004 can be a part of the control unit 4002 or can be separate there from. In some embodiments the control unit may be configured for bi-directional data transfer. An electrical generating component 4006 is coupled to a thermal sensor 4008. The thermal sensor 4008, is coupled to the control interface 4004. The temperature of the electrical generating component 4006 is determined by the thermal sensor 4008. The thermal sensor 4008 transfers the data to the control interface 4004, and the control unit 4002. The thermal sensor 4008 may be configured to monitor a single electrical generating component or a plurality of electrical generating components. The electrical generating component may contain one or more electrical generating components.

In some embodiments, the control system 4000 is in communication with an active power component 4016, a reactive power component 4014 and the electrical generating component 4006. The active power component 4016 may be coupled to an active sensor 4012. The active sensor 4012 may monitor a voltage, a current, a power or an impedance. In some embodiments, the active power component 4016 may be coupled directly to the control interface 4004. The reactive power component 4014 may be coupled to a reactive sensor 4010. The reactive sensor 4010 may monitor a reactive power volt-amperes reactive (VAR). In some embodiments, the reactive power component 4014 may be coupled directly to the control interface 4004. The control interface 4004, transfers data to the control unit 4002 and receives data to transfer back to the active power component 4016 and/or the reactive power component 4014. The active power component 4016 and the reactive power component 4014 may then adjust or maintain the systems performance based on the data received from the control interface 4004. In some embodiments, control system 4000 may occur continuously or may occur at periodic intervals. In some embodiments, the control unit 4018 may be configured to adjust the reactive power component 4014 or the active power component 4016 when the thermal sensor 4008 indicates the that the electrical generating component 4003 is approaching the thermal limit. In some embodiments, the control unit 4018 may be configured to adjust the reactive power component 4014 or the active power component 4016, when the thermal limit is exceeded or exceeded only for longer than a specified time period.

In some embodiments, the control system 4000 may include a power converter configured with an insulated gate bipolar transistor circuit, a switching capacitor matrix or a solid state rectifier arrangement. In some embodiments, the electrical generating component 4006 may contain a plurality of electrical generating components. In some embodiments, the active power component 4016 may include the turbine rotors and the like. In some embodiments, the reactive power component 4014 may include an uninterruptable power supply systems, a battery system, an alternate generation system such as a diesel generation or a combustion generation and the like.

Figure 10A:
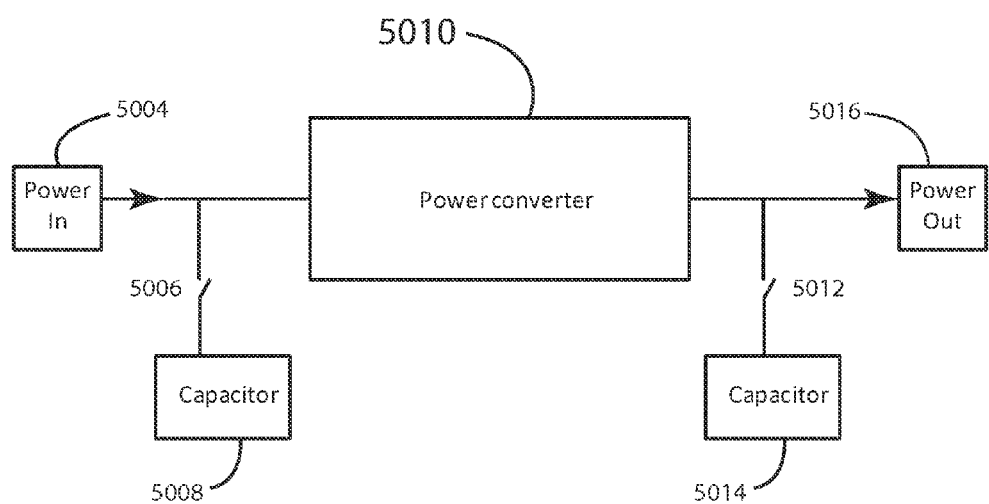
FIG. 10a is an example block diagram of a power converter.

FIG. 10a is an example block diagram of the reactive power component 4014. Power converter 5010 includes an input to receive power in 5004 and an output to output power out 5016. Coupled in parallel to the input of the power converter 5010 is a capacitor 5008. The capacitor 5008 is coupled to the input of the power converter 5010 by a switch 5006. Coupled in parallel to the output of the power converter 5010 is a capacitor 5014. The capacitor 5014 is coupled to the output of the power converter 5010 by a switch 5012.

The switch 5006 and the switch 5012 are operatively coupled to the control system 4000. The control system 4000 can control the state of each of the switched 5006 and 5012 to electrically couple and decouple each capacitor to the power converter 5010 to control or regulate the temperature of the power converter 5010.

As discussed in FIGS. 8 and 9 the power converter may be placed within the control unit. As discussed in FIGS. 1-6, the control unit may be placed within a nacelle, a fluid turbine support structure, a fluid turbine tower, or at a base of a fluid turbine tower. In some embodiments, the switched capacitors may be replaced by an alternate component such as an insulated gate bipolar transistor circuit, a solid state rectifier or the like.

Figure 10B:
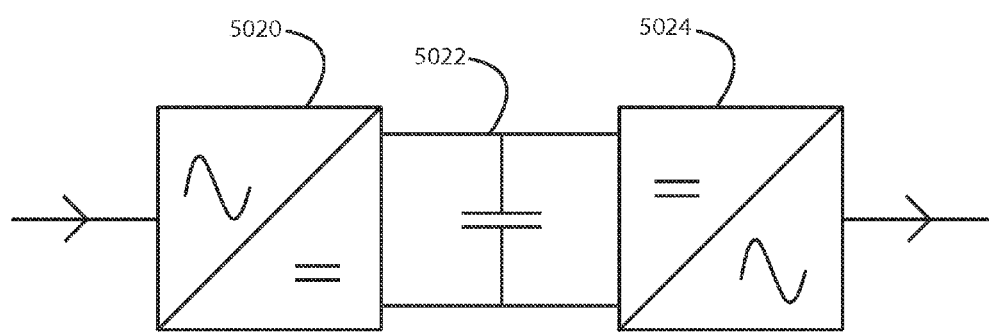
FIG. 10b is an example block diagram of a power converter.

FIG. 10b is an example block diagram of a power converter having a bridge capacitor configuration. FIG. 10b, includes an AC input 5020 to receive power and a DC output 5024 to output power. A bridged capacitor 5022, is coupled to the AC input 5020 and the DC output 5024. The AC input 5020, may receive the input power and then transfer the power to the bridged capacitor 5022. Then the power is transferred from the bridged capacitor 5022 to the DC output 5024.

As discussed in FIGS. 8 and 9 the power converter may be placed within the control unit. As discussed in FIGS. 1-6, the control unit may be placed within a nacelle, a fluid turbine support structure, a fluid turbine tower, or at a base of a fluid turbine tower. In some embodiments, the switched capacitors may be replaced by an alternate component such as an insulated gate bipolar transistor circuit, a solid state rectifier or the like.

We claim:

1. A method of regulating a temperature of an electrical generating component comprising:
    monitoring a thermal parameter of the electrical generating component within a fluid turbine;
    reducing reactive power production of the fluid turbine if the thermal parameter exceeds a thermal limit;
    reducing active power production of the fluid turbine if the thermal parameter continues to exceed the thermal limit subsequent to reducing the reactive power production; and
    shutting down the fluid turbine if the thermal parameter continues to exceed the thermal limit subsequent to reducing the reactive power production and reducing the active power production.

2. The method of claim 1, further comprising: preconfiguring a thermal sensor with an upper thermal limit.

3. The method of claim 1, further comprising: maintaining an operational temperature of the electrical component within the thermal limit wherein the operational temperature is controlled by the reactive power production.

4. The method of claim 1, further comprising: monitoring an operational temperature of the electrical generating component, during an engagement of the reactive power components.

5. The method of claim 4, further comprising: alerting a control unit if the electrical generating component exceeds the thermal limit.

6. The method of claim 5, further comprising: de-rating the power rating of the fluid turbine.

7. The method of claim 5, further comprising: de-rating the reactive power rating of the fluid turbine.

8. The method of claim 5, further comprising: maintaining a de-rated power production state, and monitoring the operational temperature of the electrical generating component throughout a duration wherein the electrical generating component exceed the thermal limit.

9. The method of claim 8, wherein shutting down the fluid turbine is performed in response to the operational temperature of the electrical generating component exceeding the thermal limit for an interval.

10. The method of claim 9, further comprising: monitoring the operational temperature of the electrical generating component until the temperature is within the thermal limit for an interval.

11. The method of claim 10, further comprising: restarting the fluid turbine when the operational temperature of the electrical generating component is within the thermal limit for an interval.

12. A fluid turbine power generating system configured to regulate a temperature of an electrical generating component, the system comprising:
    a rotor/stator assembly of a fluid turbine;
    an active power system configured to receive a first control signal from a control unit;
    a reactive power system configured to receive a second control signal from the control unit;
    an electrical generating component having a thermal parameter and configured to transmit thermal data to the control unit; and
    the control unit having an electrical connection to the active power system and the reactive power system and the electrical generating component, the control unit configured to:

receive the thermal data from the electrical generating component of the fluid turbine;

transmit the second power signal to the reactive power system to reduce reactive power production of the fluid turbine if the thermal parameter exceeds a thermal limit;

transmit the first power signal to the active power system to reduce active power production of the fluid turbine if the thermal parameter continues to exceed the thermal limit subsequent to reducing the reactive power production; and shutdown the fluid turbine if the thermal parameter continues to exceed the thermal limit subsequent to reducing the reactive power production and the active power production.

13. The system of claim 12, further comprising: the control unit configured to de-rate the turbine power system rating wherein the electrical generating component exceeds the thermal limit.

14. The system of claim 13, further comprising: the control unit configured to maintain a de-rated power production state wherein an operational temperature of the electrical generating component is monitored throughout the duration of de-rated power production.

15. The system of claim 14, wherein the control unit is further configured to shut down the fluid turbine if the operational temperature of the electrical generating component exceeds the thermal limit for an interval.

16. The system of claim 15, further comprising: the control unit configured to monitor the operational temperature of the electrical generating component until the operational temperature returns within the thermal limit for an interval.

17. The system of claim 16, further comprising: the control unit configured to re-start the fluid turbine when the operational temperature of the electronic generating component is within the thermal limit for the interval.

18. The system of claim 12, wherein the electrical generating component is a heat generating component.

19. The system of claim 12, wherein the thermal parameter is variable.

20. A non-transitory computer readable medium comprising instructions configured to cause a computer processor to execute a method comprising the steps of:

monitoring a thermal parameter of an electrical generating component within a fluid turbine;

determining if the thermal parameter of the electrical generating component exceeds a thermal limit;

reducing the reactive power production of the fluid turbine if the thermal parameter exceeds the thermal limit;

reducing active power production of the fluid turbine if the thermal parameter continues to exceed the thermal limit subsequent to reducing the reactive power production; and shutting down the fluid turbine if the thermal parameter continues to exceed the thermal limit subsequent to reducing the reactive power production and reducing the active power production.

* * * * *